United States Patent [19]

Heilskov

[11] 4,376,419

[45] Mar. 15, 1983

[54] MARINE FENDER

[75] Inventor: Jens A. Heilskov, Madison, Wis.

[73] Assignee: Sidewinder International, Ltd., Wilmington, N.C.

[21] Appl. No.: 281,556

[22] Filed: Jul. 8, 1981

[51] Int. Cl.³ .......................................... B63B 59/02
[52] U.S. Cl. .................................... 114/219; 114/362
[58] Field of Search .......... 114/219, 220, 362, 221 R; 405/211–215

[56] References Cited

U.S. PATENT DOCUMENTS 3,000,021  9/1961  Lang ................................... 114/362
3,540,403  11/1970  Russell .............................. 114/219

FOREIGN PATENT DOCUMENTS 2527247  7/1976  Fed. Rep. of Germany ...... 114/362
2101482  3/1972  France ............................... 114/362
243427   9/1969  U.S.S.R. ............................. 114/219

*Primary Examiner*—Trygve M. Blix
*Assistant Examiner*—Jesus D. Sotelo
*Attorney, Agent, or Firm*—Wegner, McCord, Wood & Dalton

[57] ABSTRACT

A marine fender structure including a plurality of rollers rotatably mounted on a pair of flexible elongated supports. Horizontal spacers are provided at vertically spaced intervals along these supports to maintain the supports in horizontally spaced relationship whereby the rollers may freely roll along the side of the marine structure for facilitated functioning thereof in serving as fenders. Retaining structure is provided for retaining the rollers and spacer elements in association with the support elements in groups of a pair of rollers and one of the spacer elements at vertically spaced positions along the fender structure. In the illustrated embodiment, the spacer elements define rungs permitting the fender structure to further serve as a ladder.

14 Claims, 2 Drawing Figures

MARINE FENDER

BACKGROUND OF THE INVENTION

1. Field of the Invention

This invention relates to fending devices and in particular to marine fender structures.

2. Description of the Background Art

It is conventional in the marine art to provide fenders which are hung over the side of the marine craft or other marine structure so as to prevent the craft or structure from engaging the dock or pier when tied up thereto. Such fenders are conventionally formed of relatively large cylindrical means and hung on line from cleats or the like on the deck of the craft.

In one known form, the fender is formed of line. Also known are hollow fenders formed of synthetic resin.

The fenders must be formed of a material capable of withstanding the substantial stresses applied against them as the marine craft moves toward the stationary objects, such as the pier or similar object. At the same time, the fenders must be formed of suitable material to prevent damage to the craft as a result of the fending action.

SUMMARY OF THE INVENTION

The present invention comprehends an improved marine fender structure wherein the fenders are effectively formed of a plurality of rollers rotatably carried on a pair of horizontally spaced lines. The rollers may be disposed in horizontally related pairs on the lines.

The lines may be spaced apart by suitable horizontal spacers.

In the illustrated embodiment, the spacers further serve as rungs permitting the fender structure to further serve as a marine ladder.

The spacers maintain the rollers in spaced relationship preventing entanglement of the lines and providing a vertical axis for rotation of the rollers thereabout. The invention further comprehends the provision of improved retaining means for retaining the rollers and spacer elements in association with the lines in groups of vertically spaced pairs of rollers in an associated spacer element, the retaining means including a first sleeve secured to one of the support elements, a second sleeve secured to the other of the support elements, a first of the rollers being rotatively mounted to the one support element closely above the first sleeve, a second of the rollers being rotatively mounted to the other support element closely above the second sleeve, a first tubular spacer mounted loosely about the first support element closely above the first roller, a second tubular spacer mounted loosely about the second support element closely above the second roller, a spacer element being positioned with the first support element extending through the through opening in one of the spacer element ends and the second support element extending through the through opening in the other of the spacer element ends, the spacer element ends being disposed closely above the first and second tubular spacers respectively, a third tubular spacer mounted loosely about the first support element closely above the one end of the spacer element, a fourth tubular spacer mounted loosely about the second support element closely above the other end of the spacer element, a third sleeve secured to the one support element closely above the third tubular spacer, and a fourth sleeve secured to the other support element closely above the fourth tubular spacer, the rollers being disposed in horizontally spaced relationship with the support elements extending vertically in horizontally spaced relationship.

Means may be provided at one end of the spaced lines for securing them jointly to a suitable support on the marine craft or the like, permitting the midportion of the spacer elements to act as ladder rungs.

Thus, the marine fender structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
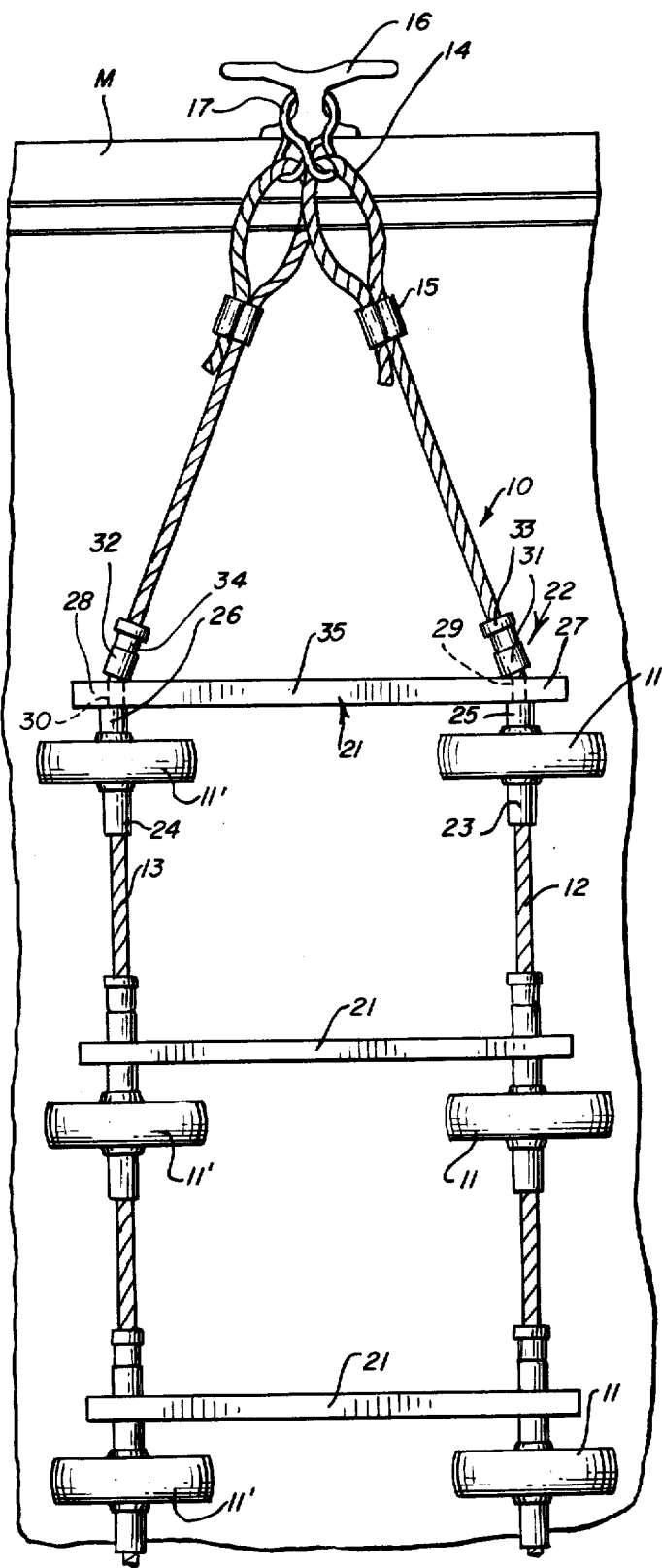
FIG. 1 is a fragmentary vertical elevation of a marine fender structure embodying the invention.

In the illustrative embodiment of the invention as disclosed in the drawing, a marine fender structure generally designated 10 is shown to include a plurality of rollers 11 rotatably mounted on a pair of flexible elongated support elements comprising cables 12 and 13. In the illustrated embodiment, each of cables 12 and 13 is provided with an upper loop portion 14 provided by a crimped sleeve 15. As shown in FIG. 1, the loops 14 may be connected to a cleat 16 carried on the marine craft M by means of a conventional locking anchor 17.

Figure 2:
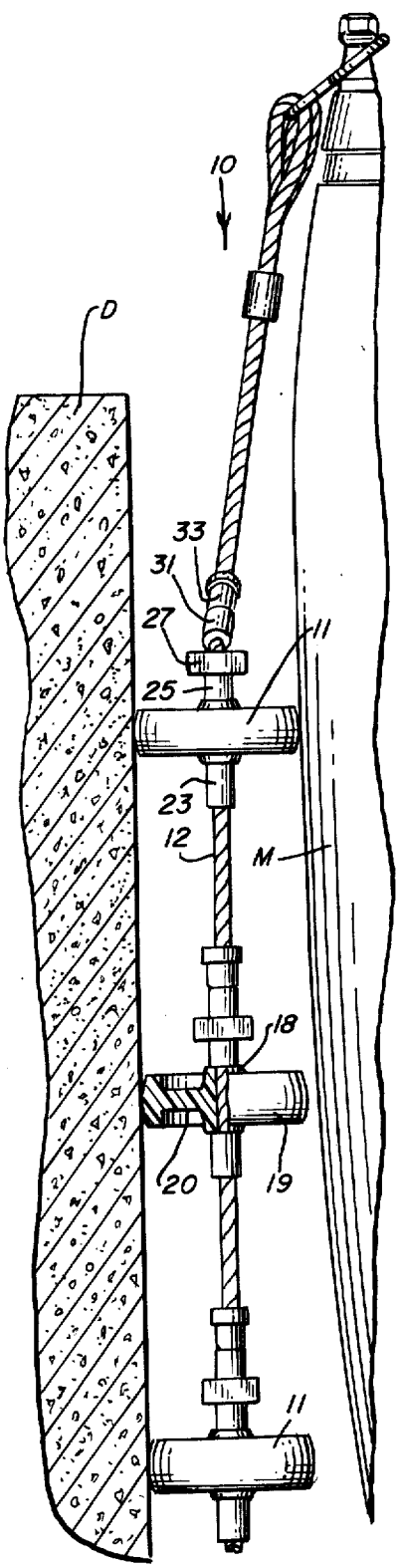
FIG. 2 is a fragmentary side elevation thereof with portions shown in section to facilitate illustration of the invention.

A plurality of rollers 11 is mounted to each of the cables 12 and 13, as best seen in FIG. 1, to define fender elements extending between the marine craft M and the structure to which it may be tied, such as dock D, as seen in FIG. 2. In the illustrated embodiment, rollers 11 comprise wheels each having a hub portion 18 and a peripheral portion 19. The peripheral portion may be connected to the hub portion by a relatively thin annular web portion 20 which provides high strength with low weight in each of the wheels. In the illustrated embodiment, the wheels are formed of a synthetic resin and illustratively may be formed as a one-piece molded structure. In the illustrated embodiment, the resin may comprise a polyolefin resin having strands of fiberglass for reinforcement thereof. One excellent example of such a heavy duty wheel is one formed of a synthetic resin identified as FIBRELENE manufactured by American Wheel and Eng. Co.

Such polyolefin wheels have been found to provide high strength in functioning as a fender in such a fender structure 10. The polyolefin material is nonmarking and, thus, is advantageous in such fender applications in preventing unsightly deformation of the sides of the craft. Further, such polyolefin material is self-lubricating, permitting facilitated rotatable mounting thereof to the cables 12 and 13. Further, the material is nonflat spotting, notwithstanding the application of pressure to the peripheral portion over long periods of time. The material has high impact strength and is adapted for use over a wide range of temperature, such as from below freezing to approximately 200° F. The material has low water absorption and permits facilitated cleaning thereof.

The invention comprehends the provision of the rollers in horizontally related pairs in combination with an associated spacer element 21, as illustrated in FIG. 1. Thus, as shown, one group of such retaining means elements includes a first roller 11, a second roller 11' and a spacer element 21. Means generally designated 22 are associated with the rollers 11 and 11' and the spacer 21 including a first sleeve 23 secured to the cable 12. A second sleeve 24 is secured to the cable 13 horizontally of sleeve 23. Roller 11 is rotatively mounted to the cable 12 closely above first sleeve 23 and roller 11' is mounted rotatively to the cable 13 closely above the second sleeve 24.

A first tubular spacer 25 is mounted loosely about the cable 12 closely above the first roller 11 and a second tubular spacer 26 is mounted loosely about the cable 13 closely above the second roller 11'.

Spacer element 21 defines a first end portion 27 and an opposite second end portion 28 provided respectively with through openings 29 and 30. Cable 12 passes freely through opening 29 and cable 13 passes freely through opening 30, whereby the spacer element 21 is positioned with ends 27 and 28 thereof being disposed closely above the spacers 25 and 26, respectively.

A third tubular spacer 31 is mounted loosely about the cable 12 closely above the spacer element end 27 and a fourth tubular spacer 32 is mounted loosely about the cable 13 closely above the opposite end 28 of the spacer element.

A third sleeve 33 is secured to the cable 12 closely above the third tubular spacer 31, and a fourth sleeve 34 is secured to the cable 13 closely above the spacer element 32.

Thus, when the fender structure is disposed over the side of the marine craft with the upper loop portion 14 thereof secured to the cleat 16, the cables 12 and 13 hang vertically downwardly with the rollers 11 and 11' of each group being disposed in horizontally spaced relationship to rotate about parallel, horizontally spaced vertical axes defined by the cables 12 and 13, respectively. Thus, the fender structure seeks a centered relationship relative to the cleat 16 to provide an improved fending action, as illustrated in FIG. 2.

In the illustrated embodiment, the cables 12 and 13 comprise conventional metal cables. The spacer elements 21 may comprise wooden elements. If desired, the spacer elements may be formed of suitable material, wooden or otherwise, so as to permit a substantial weight to be supported on the midportion 35 thereof, whereby the spacer elements may further serve as rungs, permitting the fender structure to define a ladder for climbing up onto the marine craft from the side thereof. The sleeves 23, 24, 33 and 34 may be secured to the cables 12 and 13 as by forcible constriction thereof. In the illustrated embodiment, the sleeves are formed of metal.

In the illustrated embodiment, the tubular spacers 25, 26, 31 and 32 comprise tubular metal elements. In one improved form of the invention, the sleeves 23 and 24 were formed of stainless steel, and the spacer elements 25, 26, 31 and 32, and upper sleeves 33 and 34 were formed of aluminum. Sleeve 15 was similarly formed of aluminum.

Where the fender structure is intended to serve further as a ladder, the spacer elements 21 may have a length of approximately 18", with a vertical spacing between the spacer elements 21 of approximately 12". The resultant spacing of approximately 16" between the cables 12 and 13 provides an improved ladder arrangement with the rollers 11 and 11' providing improved stability to the rungs when so used as a ladder for improved safety. In addition, as can be seen in FIG. 2, the relatively large diameter of the rollers assures that all of the rungs will be spaced outwardly from the side of the craft M for further improved safety in the use of the device as a ship's ladder.

The fender structure is readily stowed, is lightweight, and may be readily handled in the manner of the conventional fenders by ready attachment to suitable cleats on the craft.

As the rollers may have a relatively large diameter, such as approximately 10", and a high load rating, such as 700 lbs. or more, they provide an improved fending action. The rollers alternatively may, within the scope of the invention, comprise wheels having tires which may be pneumatic or solid as desired. Preferably, the tires may be formed of scuff-resistant material.

The foregoing disclosure of specific embodiments is illustrative of the broad inventive concepts comprehended by the invention.

I claim:

1. A marine fender structure comprising:

a plurality of rollers each defining a hub portion and a peripheral portion;

first and second flexible, elongated support elements;

means for positioning said support elements in spaced, parallel relationship defined by a plurality of spacer elements, each having a midportion and opposite ends, each end being provided with a through opening;

retaining means for retaining said rollers and spacer elements in association with said support elements in groups of a pair of said rollers and one of said spacer elements, said retaining means including a first sleeve secured to one of said support elements, a second sleeve secured to the other of said support elements, a first of said rollers being rotatively mounted to said one support element closely above said first sleeve, a second of said rollers being rotatively mounted to said other support element closely above said second sleeve, a first tubular spacer mounted loosely about said first support element closely above said first roller, a second tubular spacer mounted loosely about said second support element closely above said second roller, a spacer element being positioned with said first support element extending through the through opening in one of said spacer element ends and the second support element extending through the through opening in the other of said spacer element ends, said spacer element ends being disposed closely above said first and second tubular spacers respectively, a third tubular spacer mounted loosely about said first support element closely above said one end of the spacer element, a fourth tubular spacer mounted loosely about said second support element closely above said other end of the spacer element, a third sleeve secured to said first support element closely above said third tubular spacer, and a fourth sleeve secured to said second support element closely above said fourth tubular spacer, said rollers being disposed in horizontally spaced relationship with the support elements extending vertically in horizontally spaced relationship; and means at one end of said spaced support elements for securing them jointly to a suitable support on a marine craft with the support elements hanging vertically downwardly adjacent a side of the craft with said rollers acting as rotatable fenders and said midportion of the spacer elements acting as ladder rungs.

2. The fender structure of claim 1 wherein said support elements comprise metal cables.

3. The fender structure of claim 1 wherein said spacer elements comprise wooden elements.

4. The fender structure of claim 1 wherein said sleeves comprise metal sleeves constricted onto said support elements.

5. The fender structure of claim 1 wherein said tubular spacers comprise metal elements.

6. The fender structure of claim 1 wherein said securing means comprises means forming a loop eye.

7. The fender structure of claim 1 wherein said securing means comprises means forming a loop eye and a locking anchor connected to said loop eye.

8. The fender structure of claim 1 wherein said securing means comprises sleeve means constricted about the end of each support element to form a loop eye therein.

9. A marine fender structure comprising:
a plurality of rollers formed of synthetic resin each defining a hub portion and a peripheral portion;
first and second flexible, elongated support elements;
means for positioning said support elements in spaced, parallel relationship defined by a plurality of spacer elements, each having a midportion and opposite ends, each end being provided with a through opening;
retaining means for retaining said rollers and spacer elements in association with said support elements in groups of a pair of said rollers and one of said spacer elements, said retaining means including a first sleeve secured to one of said support elements, a second sleeve secured to the other of said support elements, a first of said rollers being rotatively mounted to said one support element closely above said first sleeve, a second of said rollers being rotatively mounted to said other support element closely above said second sleeve, a first tubular spacer mounted loosely about said first support element closely above said first roller, a second tubular spacer mounted loosely about said second support element closely above said second roller, a spacer element being positioned with said first support element extending through the through opening in one of said spacer element ends and the second support element extending through the through opening in the other of said spacer element ends, said spacer element ends being disposed closely above said first and second tubular spacers respectively, a third tubular spacer mounted loosely about said first support element closely above said one end of the spacer element, a fourth tubular spacer mounted loosely about said second support element closely above said other end of the spacer element, a third sleeve secured to said first support element closely above said third tubular spacer, and a fourth sleeve secured to said second support element closely above said fourth tubular spacer, said rollers being disposed in horizontally spaced relationship with the support elements extending vertically in horizontally spaced relationship; and
means at one end of said spaced support elements for securing them jointly to a suitable support on a marine craft with the support elements hanging vertically downwardly adjacent a side of the craft with said rollers acting as rotatable fenders and said midportion of the spacer elements acting as ladder rungs.

10. The fender structure of claim 9 wherein said roller hub portion is defined by a self-lubricating bore.

11. The fender structure of claim 9 wherein said roller peripheral portion defines a crowned surface.

12. The fender structure of claim 9 wherein said rollers are formed of polyolefin resin.

13. The fender structure of claim 9 wherein said rollers are formed of polyolefin resin reinforced with high strength fibers.

14. The fender structure of claim 9 wherein each roller has a load rating of at least approximately 700 lbs.

* * * * *